(12) United States Patent
Stava et al.

(10) Patent No.: US 7,105,777 B2
(45) Date of Patent: Sep. 12, 2006

(54) DEDICATED WIRE FEED SPEED CONTROL

(75) Inventors: Elliott K. Stava, Sagamore Hills, OH (US); James P. Zucker, Northfield Center, OH (US)

(73) Assignee: Lincoln Global, Inc., Sante Fe Springs, CA (US)

( * ) Notice: Subject to any disclaimer, the term of this patent is extended or adjusted under 35 U.S.C. 154(b) by 136 days.

(21) Appl. No.: 10/765,518

(22) Filed: Jan. 27, 2004

(65) Prior Publication Data

US 2005/0161448 A1 Jul. 28, 2005

(51) Int. Cl.
*B23K 9/10* (2006.01)

(52) U.S. Cl. .............................. 219/137.71; 219/130.1

(58) Field of Classification Search ........... 219/137.71, 219/132, 130.31, 130.32, 130.33, 130.5
See application file for complete search history.

(56) References Cited

U.S. PATENT DOCUMENTS

| | | | |
|---|---|---|---|
| 4,357,518 A | * | 11/1982 | Meyer .................. 219/132 |
| 4,527,045 A | * | 7/1985 | Nakajima et al. ...... 219/137.71 |
| 4,608,482 A | * | 8/1986 | Cox et al. .............. 219/137.71 |
| 4,973,821 A | * | 11/1990 | Martin .................. 219/137.71 |
| 5,816,466 A | | 10/1998 | Seufer |
| 6,557,742 B1 | | 5/2003 | Bobeczko et al. |
| 6,705,563 B1 | | 3/2004 | Luo et al. |

FOREIGN PATENT DOCUMENTS

| | | | |
|---|---|---|---|
| GB | 1323751 | | 7/1973 |
| GB | 1410870 A | * | 10/1975 |
| GB | 1590043 | | 5/1981 |

* cited by examiner

*Primary Examiner*—Clifford C. Shaw
(74) *Attorney, Agent, or Firm*—Fay Sharpe Fagan Minnich & McKee; Brian E. Turung (57) ABSTRACT

A MIG welder and method of controlling a MIG welder which includes a wire speed selector that is used to generate a control signal which controls both the wire feed speed of a consumable electrode and the output current level of the power supply.

58 Claims, 3 Drawing Sheets

DEDICATED WIRE FEED SPEED CONTROL

The present invention relates generally to the art of welding power supplies, and more particularly relates to the control of wire feed speed and a power source of a short-circuit welding machine.

BACKGROUND OF THE INVENTION

There are many types of welding power supplies used for a variety of welding processes. Welding power supply typically includes a wire feeder, a power source, a torch or gun, a wire feeder controller, and a power source controller to control the various components. These components of the welding power supply may share a housing, or be encased in separate housings. The power source of the welding power supply typically includes the power circuitry of the welder (e.g., rectifiers, switches, transformers, SCRS, etc.) that process and provide the output power of the welding power supply. The power source controller of the welding power supply typically includes digital and/or analog circuitry, discrete and/or integrated circuitry, microprocessors, DSPS, etc., software, hardware, and/or firmware which are used to control a welding process, or a device such as a power source and/or wire feeder.

Arc welding power supply sources used for MIG welding normally include at least two welding controls. One of the welding controls is for control of arc voltage and the other welding control is for control of wire feed speed. It is not uncommon for the MIG welders to include additional controls to enable more precise control for the welding process. Indeed, some welding applications are so demanding that the welding power source includes several welding controls to achieve the required results for a particular welding application. There are, however, many "simple" welding applications which do not require precise control for the welding process. MIG welders that are designed for such applications include fewer welding controls and are typically priced lower than the more complex models. Although these welding machines designed for simple welding applications are less complex in design, these welding machines still include a plurality of welding controls for the arc voltage and/or current level of the output current of the welder and for wire feed speed. As a result, these welding controls must be properly selected in order to obtain an acceptable weld in even these simple welding applications. The required setting of two or more welding controls adds additional complexity to a welding process and increases the incidence of an improper weld being formed for a particular application.

In view of the prior art, there is a need for an arc welder that is low cost, that is simple to operate and which generates a desired current level for a particular wire feed speed by use of fewer user controlled inputs.

SUMMARY OF THE INVENTION

The present invention is directed to an apparatus and method of arc welding and more particularly directed to an apparatus and method of MIG welding that includes a simplified control arrangement for the current output level of the welder, and the control of the wire feed speed. Although the invention will be describe with particular reference to MIG welder, it will be appreciated that the invention can be expanded to other types of welding.

In accordance with one aspect of the present invention, there is provided a welder having a welding power source, a wire feeder and a wire feed speed controller. The welder is designed particularly for MIG (solid wire and gas) applications. The welder has a simplified design in that the welder includes a single wire feed control that controls both the wire feed speed of the consumable electrode and the arc welding voltage and/or current level of the welding power source. As a result, the welder of the present invention significantly simplifies the welding process by enabling an operator to select a particular wire feed speed which selection automatically generates an appropriate arc welding voltage and/or current level for the selected wire feed speed. In one embodiment of the invention, the wire feed speed selector generates a signal that is used by a wire feed speed controller to control the actual wire feed speed of an electrode being fed to a workpiece. The wire feed speed selector is typically a potentiometer that generates a linear signal; however, a non-linear signal can be generated by the potentiometer. As can be appreciated, the wire feed speed selector can be a digital selector or any other type of selector which can generate a control signal. The control signal generated by the wire feed speed selector is typically directed to a hard wire circuit and/or a microprocessor which converts the signal into a control current or voltage used to drive the motor of a wire feeder. As can be appreciated, the signal from the wire feed speed selector can be used to directly control the motor of the wire feeder. In another and/or alternative aspect of the invention, the signal generated by the wire feed speed selector is directed to a welding output controller that in turn generates a signal to the welding power source control SCRs, FETs, IGBTs, etc., to control the arc welding voltage and/or current. The welder output controller is designed to increase or decrease the arc voltage and/or current generated by the power supply of the arc welder as the wire feed speed control is changed. This particular control design for an arc welder enables the operator to control both the wire feed speed and the arc welding voltage and/or current by a single control knob or selector. This simplified design results in reduced manufacturing costs of the welder by reducing the number of parts, and simplifies a welding operation by reducing the number of control knobs on the welder.

In accordance with another and/or additional aspect of the present invention, there is provided a welder which includes a function generator that generates a particular control signal to the power source control based upon a signal received from the wire feed speed selector. The function generator can include a hard wire circuit, a microprocessor, a function table, a software program, etc. which generates one or more control signals based upon a signal received from the wire feed speed selector. As such, the function generator creates a particular relationship between the selected wire feed speed and the voltage and/or current of the arc generated by the power supply. In one embodiment of the invention, the function generator is part of a wave shape network designed to generate an arc welding voltage based upon a particular relationship with the signal generated by the wire feed speed selector. In one non-limiting aspect of this embodiment, the function generator generates an arc welding voltage based upon the following equation:

$$V(\text{Arc Volts}) = 20 + 0.04 \times I(\text{Arc Amps})$$

V(Arc Volts) is the voltage level of the arc formed between the electrode and a workpiece. I(Arc Amps) is the current level of the arc formed between the electrode and workpiece. The factor "20" in the equation relates to use of a particular shielding gas such as carbon monoxide or carbon dioxide. This value can be modified when other shielding gases are selected. For instance, a lower value would typically be selected when a shielding gas is comprised primarily of argon. The factor "0.04" in the equation represents the slope of the linear relationship between the arc volts and arc current. As can be appreciated, other values can be used. As can also be appreciated, the relationship between the arc voltage and arc current can be non-linear.

This equation can be modified by making the arc amps (I) proportional to the wire feed speed. As a result, the equation can be modified to be expressed as:

$$V(\text{Arc Volts}) = 20 + 0.04 \times (\text{WFS Volts}) \times K$$

K is a constant which is selected so that the proper magnitude of (WFS volts)×K is equal to the welding current being generated by the power supply. As is represented by the relationship above, a linear relationship is thus formed between the arc welding voltage and the selected wire feed speed. As can be appreciated, the function generator can include equations and/or various types of relationships to generate a non-linear relationship between the arc welding voltage and the wire feed speed. In addition, the resultant signal from the function generator can be further conditioned by the SCR firing circuit or other power source controllers such that the dynamic range of the arc welding voltage is within the control range of the control circuit. Consequently, the linear equation set forth above is but one of many equations that can be used.

In still another and/or alternative aspect of the present invention, there is provided a welder which includes one or more controls designed to adjust the control signal generated by the function generator. The use of a particular diameter of electrode, type of electrode, and/or shielding gas mixture can affect the quality of the weld. In the simplest design of the arc welder in accordance with the present invention, the welder includes a single control knob or selector to adjust the wire feed speed during a welding operation and uses the signal from the selected wire feed speed to also control the arc welding voltage and/or current generated by the welding power supply. In this particular design, an operator simply increases or decreases the wire feed speed for a particular welding application. The function generator of the wave shape network in the welder can be factory set for a nominal arc voltage-arc current relationship. For instance, the welding machine could be designed for use with a 0.035 inch diameter low carbon solid wire which uses a shielding gas mixture of about 75% argon and 25% carbon dioxide. So long as an operator uses this particular type of welding wire having this particular diameter in conjunction with this particular shielding gas mixture, a desired weld bead will be formed. However, if the operator deviates from these factory set parameters, the quality of the weld bead may be reduced. In order to accommodate the use of different types of welding wire, different diameters of welding wire and/or different types of shielding gases, the welder of the present invention may include one or more manual switches or selections used to define the type of electrode, the size of the electrode and/or the type of shielding gas used in a particular welding operation, and thereby appropriately change the output function generator of the wave shape network. In one embodiment of the invention, one or more manually controlled switches or selectors are inserted on the arc welder to enable an operator to select a particular type of electrode, a particular size of electrode and/or a particular type of shielding gas. In another and/or alternative embodiment of the present invention, the arc welder includes one or more internal switches or controllers designed to automatically detect the type of electrode being used, the diameter of the electrode being used and/or the type of shielding gas being used and automatically change or modify the output of the function generator of the wave shape network in accordance with one or more of these detected values. In this particular design of the welder, the simplicity of the welder is maintained since the operator still uses only a single wire feed speed knob or selector to control the wire feed speed and the arc welding voltage and/or current of the welder. Any modification to the relationship between the selected wire feed speed and the arc welding voltage and/or current is automatically adjusted based upon the detected electrode type, electrode diameter and/or shielding gas type by the welding machine.

The primary object of the present invention is the provision of an apparatus and method of welding that is simple and cost effective to use.

Another object of the present invention is the provision of an apparatus and method of welding that controls the wire feed speed and the welding arc voltage and/or current based upon a selected wire feed speed.

Still another and/or alternative object of the present invention is the provision of an apparatus and method of welding that includes a wave shape network for controlling the arc welding voltage and/or current as a function of the wire feed speed during a welding operation.

Yet another and/or alternative object of the present invention is the provision of an apparatus and method of welding that includes a wave shape network for controlling the arc welding voltage and/or current which includes a modifiable relationship between the wire feed speed and the welding arc voltage and/or current based upon a detected and/or selected electrode type, electrode size and/or shielding gas type.

Still yet another and/or alternative object of the present invention is the provision of an apparatus and method of welding that includes a wire feed speed selector that can be used by an operator to select a wire feed speed and to automatically select an appropriate arc welding voltage and/or current for a particular operation so as to generate a high quality weld bead during a particular welding operation.

A further and/or alternative object of the present invention is the provision of an apparatus and method of welding that is simpler to use than previously available arc welders.

Still a further and/or alternative object of the present invention is the provision of an apparatus and method of welding that includes a welder having less user-selectable controls so as to simplify a welding procedure.

Still yet a further and/or alternative object of the present invention is the provision of an apparatus and method of welding that includes a low cost welder having a simplified user control arrangement and which produces a high quality weld bead during a welding operation.

These and other objects and advantages will become apparent from the following description taken together with the accompanying drawing.

BRIEF DESCRIPTION OF DRAWINGS

Reference may now be made to the drawings, which illustrate various embodiments that the invention may take in physical form and in certain parts and arrangements of parts wherein.

DESCRIPTION OF THE PREFERRED EMBODIMENTS

While the present invention will be illustrated with reference to a particular welding power supply, used in a particular process, and implemented with particular components, it should be understood that the invention can also be implemented with other welding power supplies, other processes, and implemented with other components, software, hardware etc. Generally, the various aspects of this invention will be described using a MIG welding power supply; however, it will be understood that the concepts of the present invention can be used in other types of arc welding processes. This embodiment includes a power source and a wire feeder that can be housed in a single housing, or in multiple housings.

Figure 1:
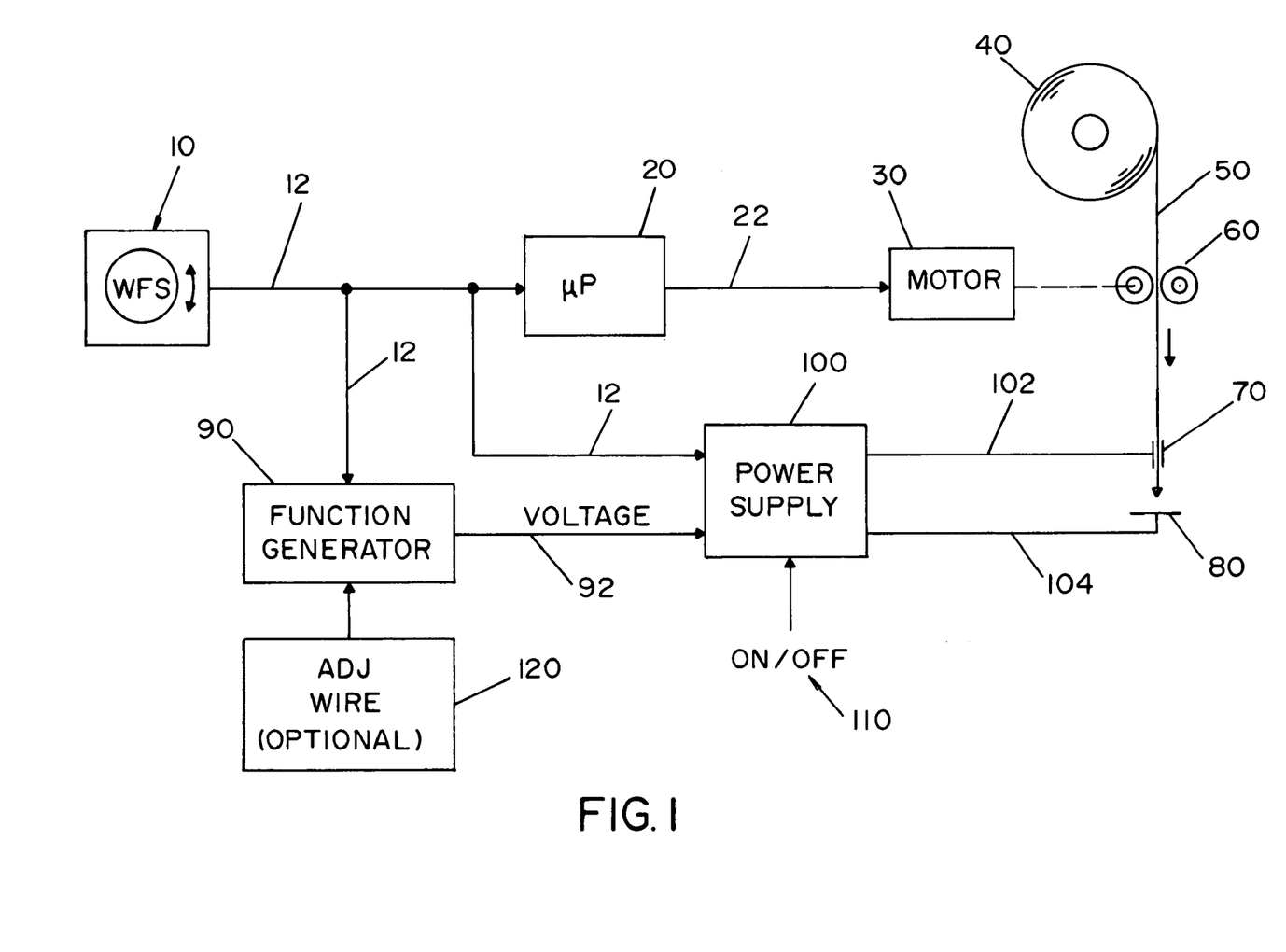
FIG. 1 is a block diagram of a welding control arrangement in accordance with the present invention in which a selected wire feed speed controls both the actual wire feed speed of an electrode during a welding operation and the arc welding voltage and/or current during the welding operation.

Referring now to FIG. 1, there is disclosed a welding control arrangement for a MIG welding power supply in accordance with the present invention. A wire feed speed selector 10 is typically a potentiometer used to generate a control signal based upon a selected wire feed speed. The control signal typically ranges between 1–5 volts; however, other volt ranges can be used. Typically, the potentiometer is a linear potentiometer; however, a non-linear potentiometer can be used. As also can be appreciated, the potentiometer can be substituted for a digital selector or other type of selector. The voltage signal generated by the wire feed speed selector is carried by line 12 to a microprocessor 20, the welding power supply 100 and a function generator 90. Microprocessor 20 converts the signal received on line 12 to a controlled voltage which in turn is directed along line 22 to the wire feed speed motor 30. The wire feed speed motor drives the wire rollers 60 to feed the consumable wire electrode 50 from the wire reel 40 to a welding gun. As can be appreciated, the microprocessor 20 can be substituted for a hard wired circuit and/or can be eliminated by designing the motor to generate a speed that is directly proportional to the signal generated by the wire feed speed selector along line 12. The operation and control of the wire feed speed motor by a wire feed selection is well known in the art, thus will not be further described.

Electrode 50 is typically a solid low carbon wire electrode having a diameter of about 0.035 inch; however, the wire electrode can be a flux cored electrode and/or an electrode having a diameter greater than or less than about 0.035 inch. Typically, the composition and type of electrode, and/or diameter of the electrode is selected for a particular welding operation to weld a particular type of workpiece.

As shown in FIG. 1, the control signal along line 12 is directed into a function generator 90. The function generator is designed to cause the power supply 100 to generate a particular wave shape for the arc welding voltage and/or current that is directed along lines 102 and 104 to the electrical contacts 70 of the welding gun and workpiece 80, respectively. The function generator is designed to generate an arc voltage signal along line 92 that is based on or proportional to the signal received along line 12. The function generator can include a hard wired circuit, a microprocessor, a software program, a function table and/or the like to generate the desired arc voltage signal along line 92. In one non-limiting arrangement, the function generator includes a hard wired circuit or a microprocessor that generates an arc voltage signal along line 92. For MIG welding, the following control relationship between arc voltage and arc amps can be used:

$$V(\text{Arc Volts}) = 20 + 0.04 \times I(\text{Arc Amps})$$

The factor "20" in the equation relates to an arc shielded by carbon monoxide and/or carbon dioxide gas. If another type of shielding gas is used, this factor may be increased or reduced. For instance, if the arc shielding gas is primarily comprised of argon, the factor will typically be less than "20". The proportionality factor of 0.04 defines the linear sloped relationship between the arc voltage and arc amps. When certain types of welding electrodes are used, this proportionality factor may be increased or reduced to achieve a desired weld bead quality for a particular welding operation. The arc amps can be made proportional to the voltage applied to the wire feed motor 30 used to drive the wire electrode to the welding gun. As a result, the following linear relationship is established between the welding arc voltage generated by the power supply and the voltage signal generated by the wire feed speed selector along line 12:

$$V(\text{Arc Volts}) = 20 + 0.04 \times (\text{WFS Volts}) \times K$$

Figure 3:
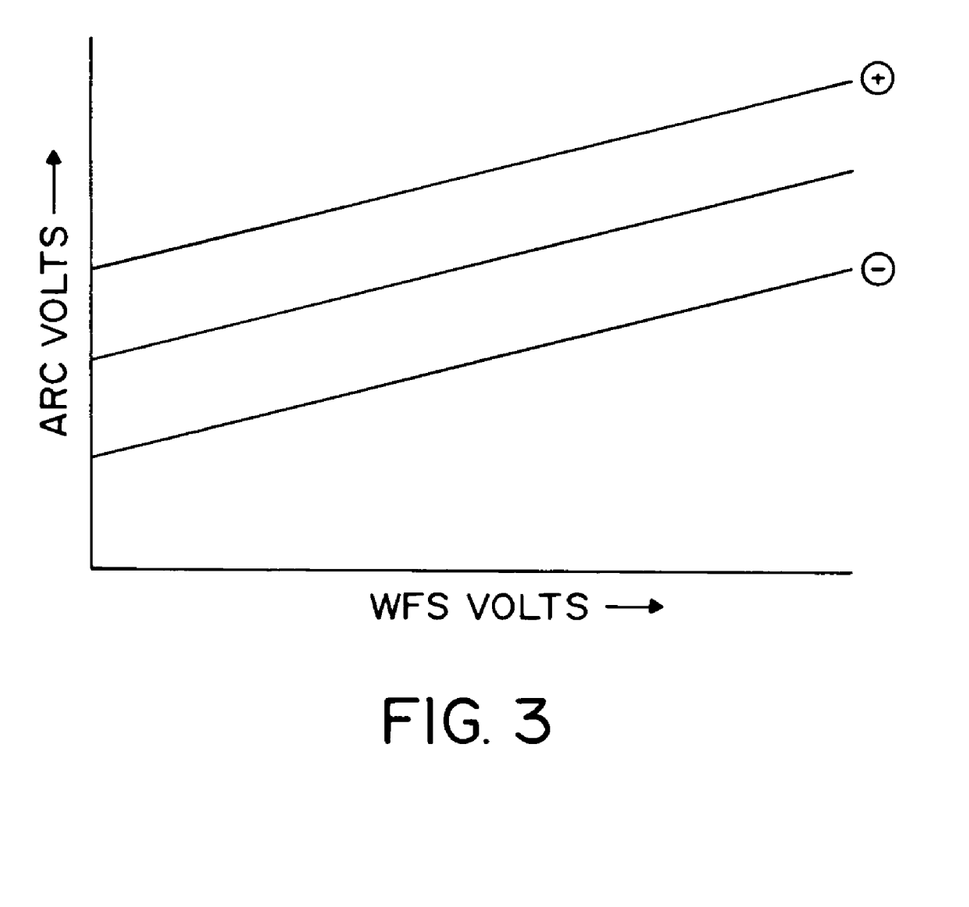

WFS volts is the voltage along line 12. The constant K is a proportionality value that is set to the proper magnitude to achieve the linear relationship between the wire feed speed control signal and the actual welding current. By incorporating this linear function into the function generator, a relationship is established between the wire feed speed control signal and the arc welding voltage and/or current and between the wire feed speed signal and the wire feed motor speed. This linear relationship is illustrated in FIG. 3. As described above, the function generator 90 generates a signal having a linear relationship between the wire feed speed selector and the current and/or voltage levels to be generated by the power supply; however, non-linear relationships can be generated by function generator 90.

The power supply 100 can be designed to generate voltages of 120 and/or 240 and can be designed to generate any type of current wave form depending on a particular welding application. As shown in FIG. 1, an on/off switch 110 is provided to activate and deactivate the power supply of the arc welder. Typically, switch 110 is located on the front panel of the arc welder. As so far described above, the simplest aspect of the invention has been described.

FIG. 1 also illustrates a wire adjustment selector 120 which can be included on the welder. The wire adjustment selector can be used by an operator to select the size and/or type of welding wire 50 which is used in a particular welding operation. By selecting the particular type and/or size of electrode, the signal from the function generator can be modified so that the appropriate arc welding voltage and/or current is supplied to a workpiece during a welding operation with a particular size/type of electrode. As can be appreciated, the wire adjustment selector can additionally and/or alternatively include a shielding gas selector which can also be used to adjust the signal from the function generator so as to adjust the arc welding voltage and/or current during the welding of the workpiece during the use of a particular shielding gas. One example of an adjustment to the function generator by adjustment selector 120 can be that the constant used in the linear relationship between the arc volts and the wire feed speed volts is increased and/or decreased. As described above, numeral constant 20 can be increased or decreased when a particular type of electrode is selected, a particular size of electrode is selected and/or a particular type of shielding gas is selected. In addition to the numerical constant being adjusted by selector 120, the proportionality constant of 0.04 set forth in the non-limiting example above can be increased or decreased depending on the particular type of electrode selected, the particular size of electrode selected and/or the particular type of shielding gas selected. As can be appreciated, selector 120 can be used to modify function generator 90 so as to generate a desired voltage signal along line 92. If the function generator is used in a particular function table, software program, etc., adjustor 120 can be used to modify or select a particular function table to be used, and/or a particular algorithm to be used so as to generate the desired voltage signal along line 92.

Referring now to FIG. 3, there is illustrated three linear relationships between the wire feed speed signal (WFS Volts) and the voltage of the arc (Arc Volts). As the wire feed speed signal increases, resulting in an increase in the speed the consumable electrode or wire is fed through the welding gun, the voltage of the arc increases in a linear relationship. The center linear line represents the preset values of the welder. If the welder does not include a shielding gas selector and/or an electrode selector, the central linear line represents the set relationship between the feed speed of the electrode and the voltage and current of the welding arc. The top and bottom linear lines represent additional linear relationships between the feed speed of the electrode and the voltage and current of the welding arc. These additional linear relationships are used when the welder includes a shielding gas selector and/or an electrode selector. The selection of a particular shielding gas or electrode can result in a different linear relationship (e.g., increased or decreased relationship) from the normal or common linear relationship (the center linear line) to be selected so as to obtain a better weld bead when using a particular shielding gas and/or electrode during an arc welding procedure.

Figure 2:
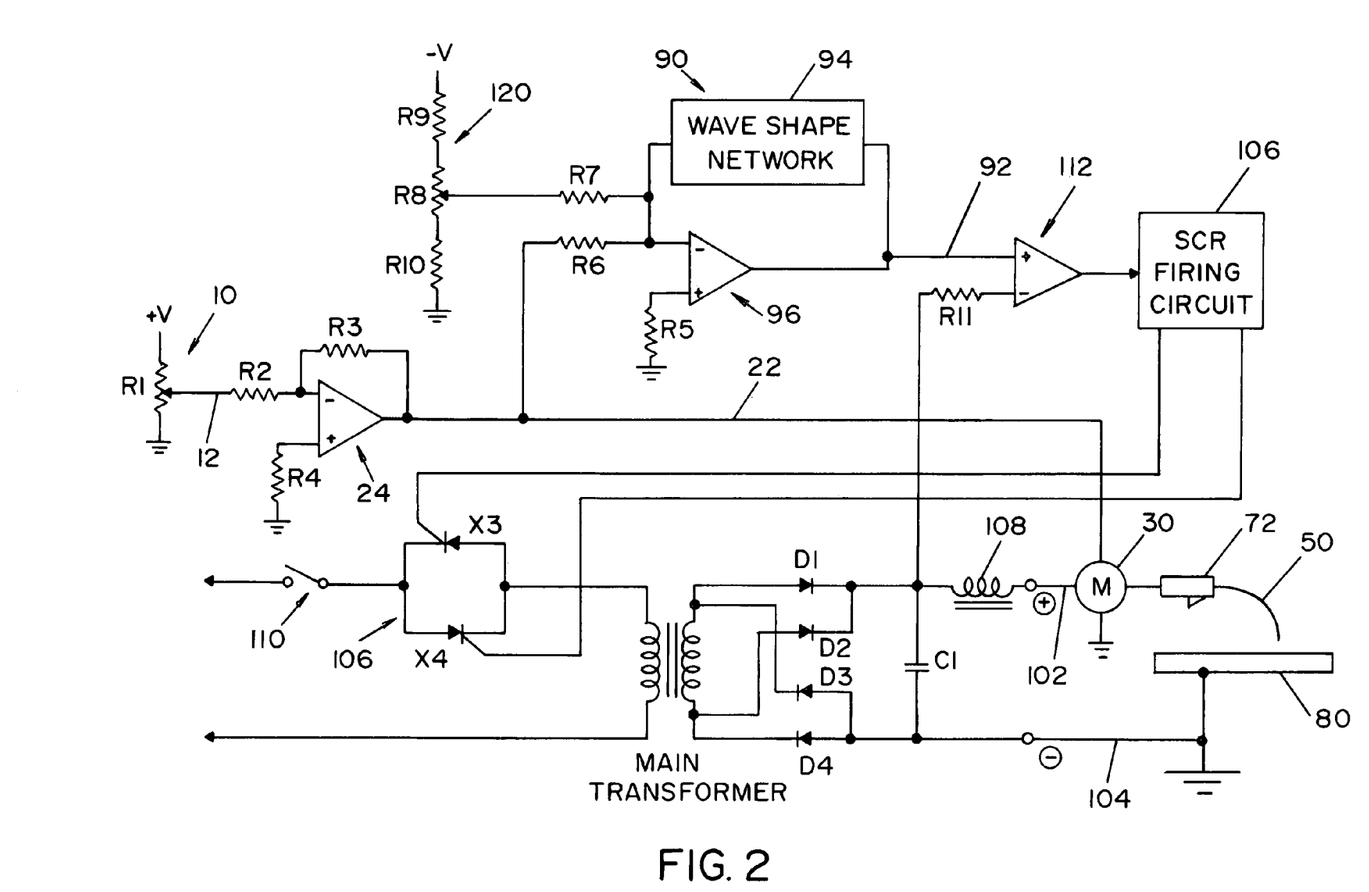
FIG. 2 is an electrical diagram representing the welding control arrangement of FIG. 1; and, FIG. 3 is a graph illustrating the relationship between wire feed speed voltage signal and the arc voltage.

Referring now to FIG. 2, anc electrical circuit is disclosed. The wire feed speed selector 10 is represented by a potentiometer represented by resistor R1. The voltage signal from the potentiometer passes through line 12 and into an amplifier 24 which increases the voltage along line 22, which in turn is used to control the speed of motor 30. As illustrated in FIG. 2, the signal from the wire feed speed selector is first amplified prior to being directed to the function generator, whereas in FIG. 1, the signal is directed directly to the function generator. As can be appreciated, no modifications or other additional modifications to the signal generated by the wire feed speed selector can be used prior to the signal being directed to the wire feed speed motor and/or function generator. As illustrated in FIG. 2, the wire feed motor 30 drives a welding electrode 50 through welding gun 72 to direct the wire to workpiece 80 and form a desired weld bead.

As stated above, the amplified signal from the wire feed speed selector is directed to a wave shape network 94 and an amplifier 96 which constitutes the function generator 90. As can be appreciated, the function generator can be formed of merely the wave shape network or can be formed of additional components. The signal generated by the function generator 90 is directed to a voltage feedback amplifier 112 on line 92 which in turn directs a signal to SCR firing circuit 106 which is part of the power supply 100. The SCR firing circuit controls transistors X3 and X4 which in turn controls the amount of power directed to the main transformer of the power supply when switch 110 is closed. In standard practice, a series of diodes D1–D4 in conjunction with capacitor C1 and a choke 108 generates the desired arc welding voltage and/or current that is transmitted to the electrode and workpiece along lines 102 and 104.

As set forth above, FIG. 1 illustrates the simplest implementation of the present invention. The MIG arc welder disclosed in FIG. 1 is designed such that it would be used with a particular type of wire having a particular type of diameter and used with a particular type of shielding gas. The arc welder would have a single control for the wire feed speed. An operator would simply increase or decrease the wire feed speed depending on a particular application. The function generator would be factory set for a nominal arc voltage-arc current relationship. One non-limiting factory setting could be set for a welding machine that is designed for use with a 0.035 inch diameter low carbon solid wire electrode that is used in conjunction with a shielding gas mixture of about 75% argon and 25% carbon dioxide. FIG. 1 also illustrates an optional design wherein at least one additional selector or switch is incorporated on the arc welder so as to enable an operator to select a particular electrode, a particular size of electrode and/or a particular type of shielding gas which is to be used in a particular welding operation. The one or more selector switches would be used to adjust the function generator so that a desired weld bead quality would be produced during a particular welding operation with a particular electrode and/or shielding gas that is different from the factory set parameters. The selector switch for this alternative parameter is illustrated in FIG. 2 as selector switch 120. The selector switch is represented as a potentiometer which can be used to increase or decrease the voltage signal to the wave shape network 94 and amplifier 96 so as to modify the control signal to the SCR firing circuit along line 92. The principal and alternative embodiments of the present invention are designed to simplify a welding operation and to minimize improper voltage and wire feed speed settings by persons unskilled in welding or not familiar with a particular welding procedure.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. For instance, the wire feeder and arc welder can be contained in a single housing or be separate units. Accordingly, it is intended to embrace all such alternatives, modifications and variations that, fall within the spirit and broad scope of the appended claims. It is also to be understood that the invention is not limited in its application to the details of construction and the arrangement of the components set forth in the description above or illustrated in the drawings. The invention is capable of other embodiments or of being practiced or carried out in various ways. Also, it is to be understood that the phraseology and terminology employed herein is for the purpose of description and should not be regarded as limiting.

We claim:

1. A welder for MIG welding comprising:
   a manual wire speed selector to generate a control signal;
   a welding wire motor that controls a wire feed speed of a wire, said speed of said welding wire motor solely a function of said control signal;
   a welding power source; and
   a power supply controller that generates a power control signal that at least partially controls a welding parameter of said welding power source, said output of said power supply controller during operation of said power supply solely a function of said control signal, said power control signal being a linear or non-linear function of said control signal, said welding parameter including a parameter selected from the group consisting of arc voltage, arc current, or combinations thereof.

2. The welder as defined in claim 1, including a motor controller that controls a speed of said welding wire motor, said motor controller including a microprocessor, a circuit containing an amplifier, and combinations thereof.

3. The welder as defined in claim 2, wherein said manual wire speed selector being the only manual control to adjustably control said wire feed speed of said wire and said output of said welding power source.

4. The welder as defined in claim 1, wherein said wire is a solid metal wire.

5. The welder as defined in claim 1, wherein the welding power source is an SCR based, phase controlled power source.

6. The welder as defined in claim 1, wherein a power supply controller includes a microprocessor that includes a function generator which generates said power control signal dependent solely on said control signal.

7. The welder as defined in claim 6, wherein said power control signal is a linear function of said control signal.

8. The welder as defined in claim 7, wherein said manual wire speed selector being the only manual control to adjustably control said wire feed speed of said wire and said output of said welding power source.

9. The welder as defined in claim 6, wherein said manual wire speed selector being the only manual control to adjustably control said wire feed speed of said wire and said output of said welding power source.

10. The welder as defined in claim 1, wherein said power control signal is a linear function of said control signal.

11. The welder as defined in claim 10, wherein said manual wire speed selector being the only manual control to adjustably control said wire feed speed of said wire and said output of said welding power source.

12. The welder as defined in claim 1, wherein said manual wire speed selector being the only manual control to adjustably control said wire feed speed of said wire and said output of said welding power source.

13. A method to control a power supply and a wire feed speed for a MIG welder based on a manually selected wire feed speed comprising:
    providing a manual wire speed selector that generates a control signal;
    providing a welding wire feeder that feeds said wire at a feed rate, said speed of said welding wire motor solely a function of said control signal;
    providing a welding power source that generates electric energy to a work piece; and
    generating a power control signal to at least partially control a welding parameter generated by said welding power supply, said output of said power supply controller during operation of said power supply solely a function of said control signal, said power control signal being a linear or non-linear function of said control signal, said welding parameter including a parameter selected from the group consisting of arc voltage, arc current, or combinations thereof.

14. The method as defined in claim 13, wherein said wire is a solid metal wire.

15. The method as defined in claim 13, wherein the welding power supply is an SCR based, phase controlled power supply.

16. The method as defined in claim 13, wherein said power control signal is at least partially generated by a microprocessor that includes a function generator that generates a signal based solely on said control signal.

17. The method as defined in claim 16, wherein said power control signal is a linear function of said control signal.

18. The method as defined in claim 17, wherein said manual wire speed selector is the only manual control to adjustably control said wire feed speed of said wire and said output of said welding power supply.

19. The method as defined in claim 16, wherein said manual wire speed selector is the only manual control to adjustably control said wire feed speed of said wire and said output of said welding power supply.

20. The method as defined in claim 13, wherein said power control signal is a linear function of said control signal.

21. The method as defined in claim 20, wherein said manual wire speed selector is the only manual control to adjustably control said wire feed speed of said wire and said output of said welding power supply.

22. The method as defined in claim 13, wherein said manual wire speed selector is the only manual control to adjustably control said wire feed speed of said wire and said output of said welding power supply.

23. A welder for MIG welding comprising:
a manual wire speed selector to generate a first control signal;
a secondary manual selector to generate a second control signal, said secondary manual selected from the group consisting of a manual selector to selected type of shielding gas, a manual selector to select a type of consumable electrode, a manual selector to select a size of a consumable electrode, or combinations thereof;
a welding wire motor that controls a wire feed speed of a welding wire, said speed of said welding wire motor solely a function of said first control signal;
a welding power source; and
a power supply controller that generates a power control signal that at least partially controls a welding parameter of said welding power source, said output of said power supply controller during operation of said power supply solely a function of said first and second control signals, said power control signal being a linear or non-linear function of said first and second control signals, said welding parameter including a parameter selected from the group consisting of arc voltage, arc current, or combinations thereof.

24. The welder as defined in claim 23, including a motor controller that controls a speed of said welding wire motor, said motor controller including a microprocessor, a circuit containing an amplifier, and combinations thereof.

25. The welder as defined in claim 24, wherein said power control signal is a linear function of said first and second control signals.

26. The welder as defined in claim 25, wherein said manual wire speed selector and said secondary manual selector are the only manual controls to adjustably control said wire feed speed of said wire and said output of said welding power source.

27. The welder as defined in claim 26, wherein said linear function includes a constant value plus a value proportional to said first control signal, said constant value dependent on said second control signal.

28. The welder as defined in claim 24, wherein said manual wire speed selector and said secondary manual selector are the only manual controls to adjustably control said wire feed speed of said wire and said output of said welding power source.

29. The welder as defined in claim 28, wherein said linear function includes a constant value plus a value proportional to said first control signal, said constant value dependent on said second control signal.

30. The welder as defined in claim 23, wherein said wire is a solid metal wire.

31. The welder as defined in claim 23, wherein the welding power source is a SCR based, phase controlled power source.

32. The welder as defined in claim 23, wherein a power supply controller includes a microprocessor that includes a function generator which generates said power control signal dependent solely on said first and second control signals.

33. The welder as defined in claim 32, wherein said manual wire speed selector and said secondary manual selector are the only manual controls to adjustably control said wire feed speed of said wire and said output of said welding power source.

34. The welder as defined in claim 33, wherein said linear function includes a constant value plus a value proportional to said first control signal, said constant value dependent on said second control signal.

35. The welder as defined in claim 23, wherein said power control signal is a linear function of said first and second control signals.

36. The welder as defined in claim 35, wherein said manual wire speed selector and said secondary manual selector are the only manual controls to adjustably control said wire feed speed of said wire and said output of said welding power source.

37. The welder as defined in claim 36, wherein said linear function includes a constant value plus a value proportional to said first control signal, said constant value dependent on said second control signal.

38. The welder as defined in claim 23, wherein said manual wire speed selector and said secondary manual selector are the only manual controls to adjustably control said wire feed speed of said wire and said output of said welding power source.

39. The welder as defined in claim 38, wherein said linear function includes a constant value plus a value proportional to said first control signal, said constant value dependent on said second control signal.

40. The welder as defined in claim 23, wherein said linear function includes a constant value plus a value proportional to said first control signal, said constant value dependent on said second control signal.

41. A method to control a power supply and a wire feed speed for a MIG welder comprising:
providing a manual wire speed selector that generates a first control signal;
providing a welding wire feeder that feeds said wire at a feed rate, said speed of said welding wire motor solely a function of said first control signal;
providing a secondary manual selector to generate a second control signal based on a selected type of shielding gas, consumable electrode, consumable electrode size, or combinations thereof;
providing a welding power source that generates electric energy to a work piece; and
generating a power control signal to at least partially control a welding parameter generated by said welding power supply, said output of said power supply controller during operation of said power supply solely a function of said first and second control signals, said power control signal being a linear or non-linear function of said first and second control signals, said welding parameter including a parameter selected from the group consisting of arc voltage, arc current, or combinations thereof.

42. The method as defined in claim 41, wherein said wire is a solid metal wire.

43. The method as defined in claim 41, wherein the welding power supply is an SCR based, phase controlled power supply.

44. The method as defined in claim 41, wherein a power control signal is at least partially generated by a microprocessor that includes a function generator that generates a signal dependent solely on said first and second control signals.

45. The method as defined in claim 44, wherein said power control signal is a linear function of said first and second control signals.

46. The method as defined in claim 45, wherein said manual wire speed selector and said secondary manual selector are the only manual controls to adjustably control said wire feed speed of said wire and said output of said welding power supply.

47. The method as defined in claim 46, wherein said linear function includes a constant valve plus a value proportional to said first control signal, said constant value dependent on said second control signal.

48. The method as defined in claim 45, wherein said linear function includes a constant valve plus a value proportional to said first control signal, said constant value dependent on said second control signal.

49. The method as defined in claim 44, wherein said manual wire speed selector and said secondary manual selector are the only manual controls to adjustably control said wire feed speed of said wire and said output of said welding power supply.

50. The method as defined in claim 49, wherein said linear function includes a constant valve plus a value proportional to said first control signal, said constant value dependent on said second control signal.

51. The method as defined in claim 44, wherein said linear function includes a constant valve plus a value proportional to said first control signal, said constant value dependent on said second control signal.

52. The method as defined in claim 41, wherein said power control signal is a linear function of said first and second control signals.

53. The method as defined in claim 52, wherein said manual wire speed selector and said secondary manual selector are the only manual controls to adjustably control said wire feed speed of said wire and said output of said welding power supply.

54. The method as defined in claim 53, wherein said linear function includes a constant valve plus a value proportional to said first control signal, said constant value dependent on said second control signal.

55. The method as defined in claim 52, wherein said linear function includes a constant valve plus a value proportional to said first control signal, said constant value dependent on said second control signal.

56. The method as defined in claim 41, wherein said manual wire speed selector and said secondary manual selector are the only manual controls to adjustably control said wire feed speed of said wire and said output of said welding power supply.

57. The method as defined in claim 56, wherein said linear function includes a constant valve plus a value proportional to said first control signal, said constant value dependent on said second control signal.

58. The method as defined in claim 41, wherein said linear function includes a constant valve plus a value proportional to said first control signal, said constant value dependent on said second control signal.

* * * * *